United States Patent [19]
Rives

[11] Patent Number: 5,331,522
[45] Date of Patent: Jul. 19, 1994

[54] SIGNALLING LIGHT MOUNTED ON A BACK SHELF OF A MOTOR VEHICLE

[75] Inventor: Claude Rives, Evreux, France

[73] Assignee: Valeo Vision, Bobigny, France

[21] Appl. No.: 44,986

[22] Filed: Apr. 7, 1993

[30] Foreign Application Priority Data

Apr. 8, 1992 [FR] France ............... 92 04293

[51] Int. Cl.$^5$ ............................................. B60Q 1/26
[52] U.S. Cl. ................................. 362/80.1; 362/294; 362/345
[58] Field of Search ............... 362/61, 80, 80.1, 294, 362/345, 373

[56] References Cited

U.S. PATENT DOCUMENTS

| | | | |
|---|---|---|---|
| 4,575,782 | 3/1986 | Levine et al. | 362/80.1 X |
| 4,654,757 | 3/1987 | Birkhauser | 362/61 |
| 4,777,569 | 10/1988 | Wen | 362/80 |
| 4,831,501 | 5/1989 | Okamoto et al. | 362/80.1 X |
| 4,937,712 | 6/1990 | Caffin et al. | 362/80.1 |
| 4,945,456 | 7/1990 | Kakidaira | 362/80.1 |

FOREIGN PATENT DOCUMENTS 9114246 2/1992 Fed. Rep. of Germany .
2583854 12/1986 France .

*Primary Examiner*—Stephen F. Husar

[57] ABSTRACT

A signalling light for mounting on a back shelf of a motor vehicle, and for being covered by a cap or the like, the light comprising a box that is open towards the back window of the vehicle and that contains a filament bulb that extends from one side of said box into said box, the box being closed adjacent to the back window of the vehicle by a closure glass. According to the invention said box includes a removable portion having a cross-section that is substantially U-shaped and that forms a heat screen between the filament bulb and the cap, said removable portion constituting an access hatch giving access to the bulb. The light is suitable for mounting on the back shelf of a motor vehicle.

4 Claims, 2 Drawing Sheets

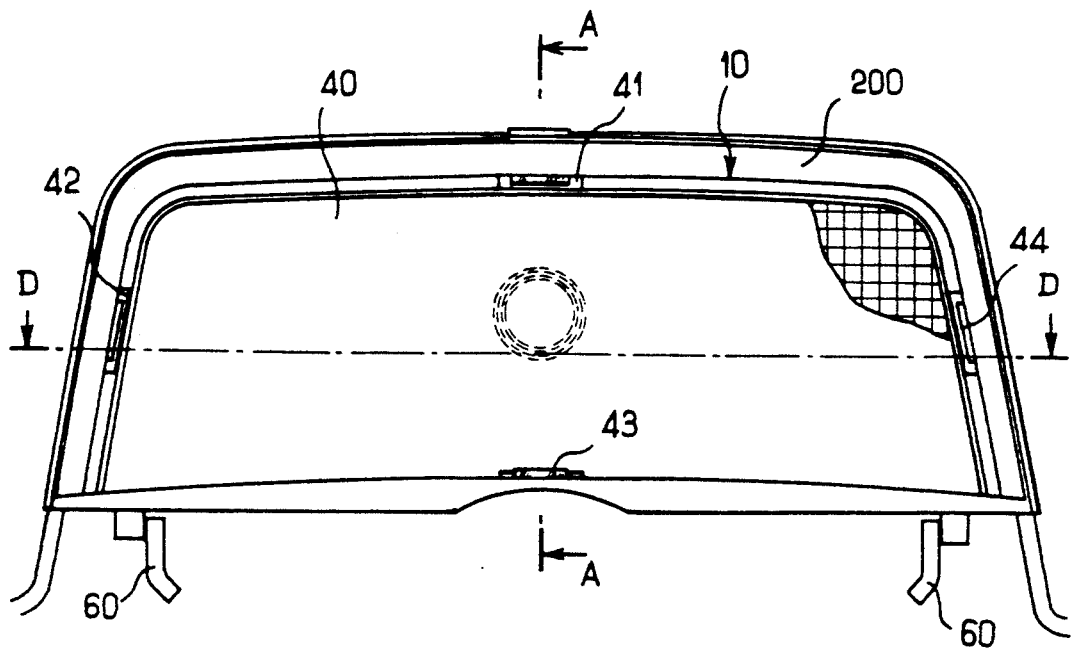
FIG_1
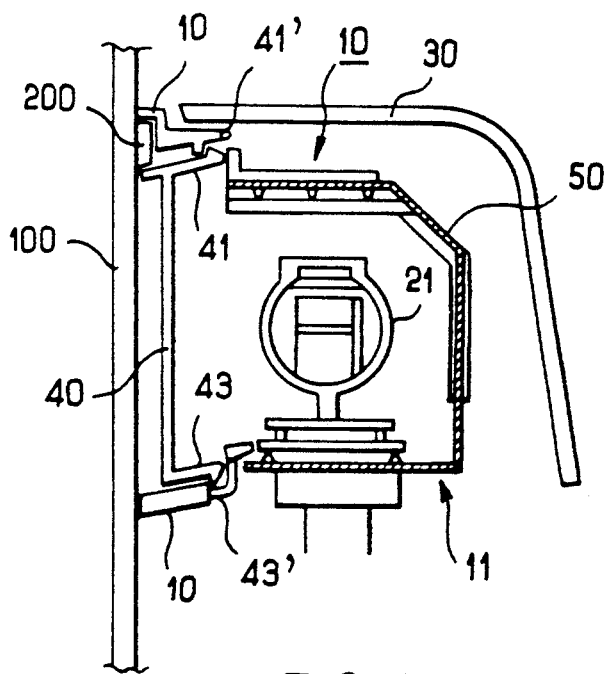
FIG_2

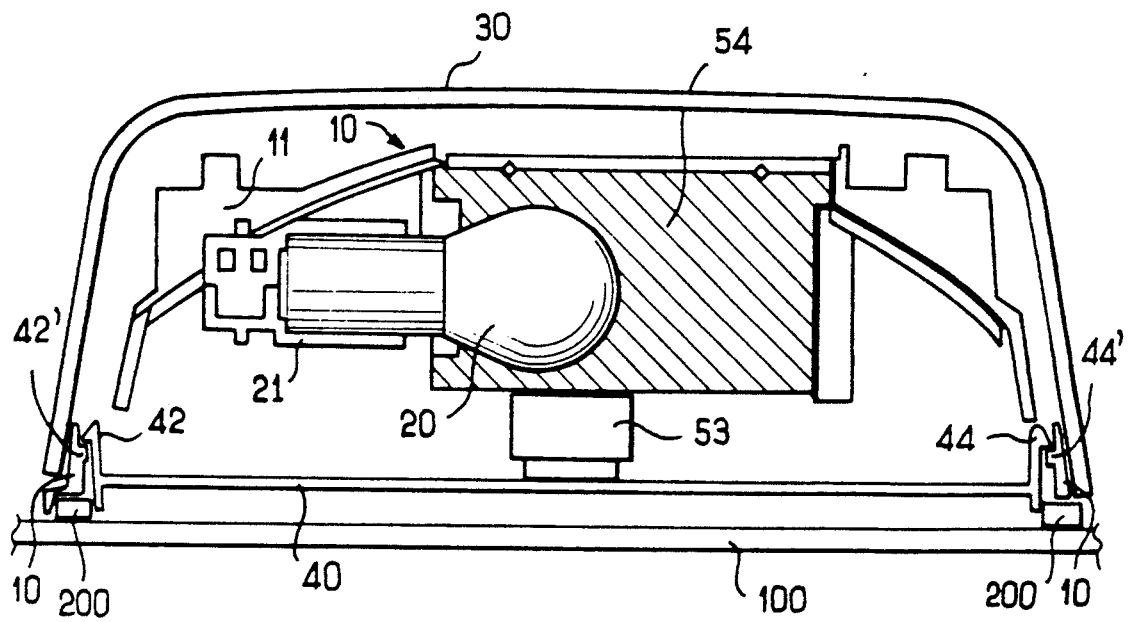
FIG_3
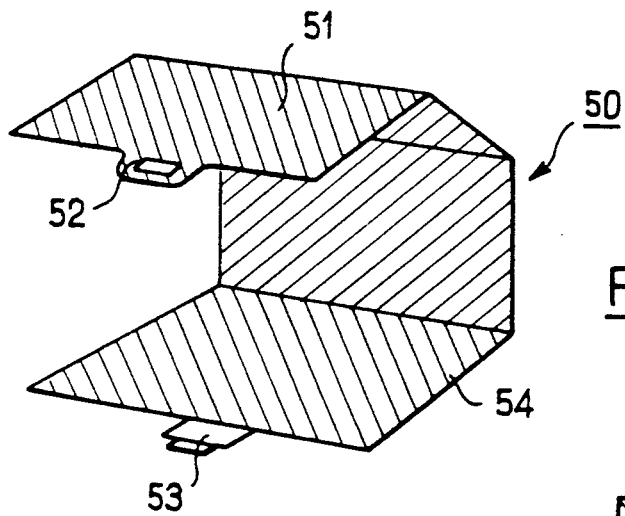
FIG_4
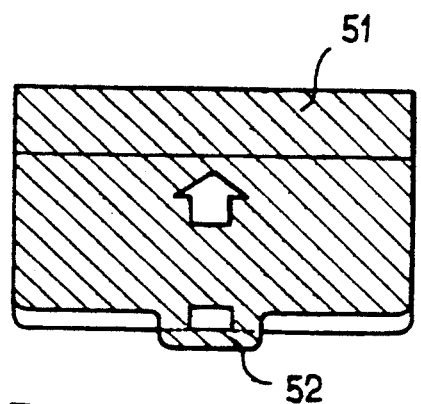
FIG_5

SIGNALLING LIGHT MOUNTED ON A BACK SHELF OF A MOTOR VEHICLE

FIELD OF THE INVENTION

The present invention relates to a signalling light mounted on a back shelf of a motor vehicle.

BACKGROUND OF THE INVENTION

At present, there is known in the prior art, a signalling light, in particular stoplight, that is mounted on a back shelf of a motor vehicle and that comprises a housing containing filament bulb. The housing is closed adjacent to a back window by a translucent glass through which the signalling light beam is emitted, and it is covered by an outer cap that extends around the box between the back shelf and the back window. The light and the outer cap are fixed to the back shelf of the vehicle.

The major drawback of such a signalling light lies in the fact that it is necessary to dismantle the light completely in order to change the bulb. It is necessary to begin by removing the outer cap and then to dismount the box and the closure glass in order to gain access to the bulb which is fixed on an inside wall of said box.

SUMMARY OF THE INVENTION

In order to mitigate that drawback, the present invention provides a signalling light for mounting on a back shelf of a motor vehicle, and for being covered by a cap or the like, the light comprising a box that is open towards the back window of the vehicle and that contains a filament bulb that extends from one side of said box into said box, the box being closed adjacent to the back window of the vehicle by a closure glass, wherein said box includes a removable portion forming a heat screen between the filament bulb and the cap, said removable portion constituting an access hatch giving access to the bulb.

Thus, it is easy to change the bulb mounted inside the signalling light of the invention. To do this, it suffices to remove the outer cap overlying said box and to take off the removable portion in order to have access to said bulb.

In an embodiment of the signalling light of the invention, the cross-section of the removable portion is substantially U-shaped. The removable portion should be a fairly close fit over the general shape of the box.

Also, in accordance with the invention, said removable portion includes at least one tab on its top portion situated above the bulb, said tab co-operating with an adjacent portion of the box.

BRIEF DESCRIPTION OF THE DRAWINGS

The following description of non-limiting embodiments given with reference to the accompanying drawings shows how the invention can be implemented, and what it consists in.

FIG. 1 is a face view of a signalling light of the invention.

FIG. 2 is a section view on plane AA of the signalling light shown in FIG. 1.

FIG. 3 is a section view on plane DD of the signalling light shown in FIG. 1.

FIG. 4 is a perspective view of the removable portion of the box of the FIG. 1 signalling light.

FIG. 5 is a plan view of the removable portion of FIG. 4.

MORE DETAILED DESCRIPTION

With reference initially to FIGS. 1, 2, and 3, there can be seen a signalling light of the invention. This signalling light which is designed to be mounted on a back shelf of a motor vehicle comprises a box 10 that is open towards the rear window 100 of the vehicle and that contains a filament bulb 20 mounted in a socket 21 which is fixed on an inside side wall 11 of said box 10, the bulb extending transversely inside the box 10. The base of the box 10 is fixed by means of fasteners 60 to the back shelf (not shown) of the vehicle.

In addition, the signalling light is covered by an outer cap 30. Said box 10 is closed adjacent to the back window 100 by a closure glass 40. The outer edges of the closure glass 40 include four fastening catches 41, 42, 43, 44 that engage the adjacent edges of the box 10, said adjacent edges including flats 41', 42', 43', and 44' that co-operate with said catches.

In addition, as can be seen in FIGS. 1, 2, and 3, the outer cap 30 is connected to the adjacent edges of the box 10 via its side edges and its top edge, and it is fixed to the back shelf (not shown) of the vehicle via its bottom edge. In addition, the top and side outer edges of said box 10 and of the closure glass 40 bear against a sealing gasket 200 that is clamped against the back window 100 of the motor vehicle.

As can be seen more clearly in FIGS. 2 and 3, the box 10 includes a removable portion 50 that forms a heat screen between the filament bulb 20 and the outer cap 30. Whereas the outer cap 30 and the box 10 are usually made of molded plastic, the removable portion is preferably made of metal, thereby making it possible, in particular, to disperse the heat given off by the bulb 20 while it is alight, and to keep the outer cap at a reasonably low temperature. The said removable portion 50 may also be polished or coated with a layer that reflects light to a greater or lesser extent. As a result, said removable portion also forms a reflector for at least a portion of the light emitted towards it by the filament bulb 20, so as to reflect the light towards the back window 100. This removable portion 50 also constitutes a hatch giving access to the bulb 20.

As shown in FIGS. 2 and 4, the said removable portion 50 has a substantially U-shaped cross-section.

As can be seen better in FIGS. 4 and 5, the removable portion 50 includes two fastening tabs 52 and 53 situated respectively on its top portion 51 and its bottom portion 54, which portions are placed respectively above and below the filament bulb 20. These two tabs 52 and 53 snap onto teeth provided on the adjacent portions of said box 10, and said tabs 52 and 53 are disengaged therefrom by initially pushing and then pulling on the portion 50 so as to cause it to slide towards the right in FIG. 2. This gives access to the bulb 20. The removable portion 50 is locked back in place by opposite displacements, and at the end of its stroke it snaps into place.

I claim:

1. A signaling light for mounting on a back shelf of a motor vehicle, and for being covered by a cap, the light comprising a box that is open toward the back window of the vehicle and that contains a filament bulb that extends from one side of said box into said box and that gives off heat while it is alight, the box being closed adjacent to the back window of the vehicle by a closure glass, wherein said box includes a removable portion having a cross-section that is substantially U-shaped and that is located between the filament bulb and the cap and constitutes a heat screen capable of dispersing the heat given off by the said filament bulb to keep the cap at a low temperature, said removable portion constituting an access hatch giving access to the bulb.

2. A signaling light according to claim 1, wherein said removable portion includes at least one tab on its top portion situated above the bulb, said tab cooperating with an adjacent portion of the box.

3. A signaling light according to claim 1, wherein the removable portion is made of metal.

4. A signaling light according to claim 1, wherein the removable portion forms a reflector for at least a fraction of the light flux emitted toward it from the filament bulb.

* * * * *